United States Patent
Liu et al.

(10) Patent No.: US 10,311,900 B1
(45) Date of Patent: Jun. 4, 2019

(54) MAGNETIC CORE AND COIL DESIGN FOR DOUBLE PERPENDICULAR MAGNETIC RECORDING (PMR) WRITERS

(71) Applicant: Headway Technologies, Inc., Milpitas, CA (US)

(72) Inventors: Kowang Liu, Fremont, CA (US); Yuhui Tang, Milpitas, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/874,986

(22) Filed: Jan. 19, 2018

(51) Int. Cl.
*G11B 5/127* (2006.01)
*G11B 5/17* (2006.01)
*G11B 5/39* (2006.01)
*G11B 5/48* (2006.01)
*G11B 5/31* (2006.01)
*G11B 5/00* (2006.01)

(52) U.S. Cl.
CPC .......... *G11B 5/3909* (2013.01); *G11B 5/1278* (2013.01); *G11B 5/17* (2013.01); *G11B 5/315* (2013.01); *G11B 5/3113* (2013.01); *G11B 5/3123* (2013.01); *G11B 5/3133* (2013.01); *G11B 5/3163* (2013.01); *G11B 5/4826* (2013.01); *G11B 2005/0021* (2013.01)

(58) Field of Classification Search
CPC ....... G11B 5/1278; G11B 5/17; G11B 5/3113; G11B 5/3123; G11B 5/3133; G11B 5/315; G11B 5/3163
USPC ............ 360/123.03, 123.06, 123.11, 125.04, 360/125.3, 294.7
See application file for complete search history.

(56) References Cited

U.S. PATENT DOCUMENTS

| | | | |
|---|---|---|---|
| 7,907,360 B2 | 3/2011 | Mak et al. | |
| 8,116,031 B2 * | 2/2012 | Alex | G11B 5/1278 360/123.02 |
| 8,228,627 B2 * | 7/2012 | Koizumi | G11B 5/3123 360/125.01 |

(Continued)

OTHER PUBLICATIONS

Co-pending U.S. Appl. No. 15/942,440, filed Apr. 2, 2018, by Kowand Liu et al., "Magnetic Core and Coil Design for Double Perpendicular Magnetic Recording (PMR) Writers," 50 pgs.

(Continued)

*Primary Examiner* — Jefferson A Evans
(74) *Attorney, Agent, or Firm* — Saile Ackerman LLC; Stephen B. Ackerman

(57) ABSTRACT

A dual PMR writer is disclosed wherein the better of the two writers on a slider is integrated into a head gimbal assembly to improve area density capability mean and sigma values, and the other writer is disabled. Each of a driving coil (DC) and bucking coil (BC) have two outer portions that form a U shape with a front side, and have a center portion connected to each of the two outer portions with a narrow arm in which direct current resistance (DCR) is enhanced during a write process. As a result, when writer (coil) induced write gap (WG) protrusion is overlaid on the dynamic fly height (DFH) protrusion profile, the net WG protrusion profile has a maximum value at a cross-track position aligned with a main pole tip in the better writer thereby substantially minimizing magnetic spacing loss compared with conventional dual PMR writers.

20 Claims, 10 Drawing Sheets

(56) References Cited

U.S. PATENT DOCUMENTS

| | | | |
|---|---|---|---|
| 8,310,782 B2* | 11/2012 | Song | G11B 5/1278 360/121 |
| 9,171,561 B1 | 10/2015 | Gadbois et al. | |
| 9,218,830 B2* | 12/2015 | Wu | G11B 5/3163 |
| 9,387,568 B1 | 7/2016 | Ilaw et al. | |
| 9,613,642 B1 | 4/2017 | Erden et al. | |
| 9,620,153 B1* | 4/2017 | Sasaki | G11B 5/3123 |
| 9,754,612 B2* | 9/2017 | Wei | G11B 5/315 |
| 9,805,744 B1* | 10/2017 | Xue | G11B 5/3116 |
| 9,865,301 B1* | 1/2018 | Wiesen | G11B 27/36 |
| 9,934,796 B2* | 4/2018 | Wei | G11B 5/315 |
| 2006/0145721 A1 | 7/2006 | Ton-Churo | |
| 2008/0112080 A1* | 5/2008 | Lengsfield | G11B 5/1278 360/125.04 |
| 2008/0291580 A1* | 11/2008 | Yamashita | G11B 5/1278 360/314 |
| 2009/0015965 A1* | 1/2009 | Sunwoo | G11B 5/3123 360/110 |
| 2011/0242701 A1* | 10/2011 | Ohtake | B82Y 10/00 360/99.08 |
| 2017/0256275 A1 | 9/2017 | Hutchinson et al. | |

OTHER PUBLICATIONS

Co-pending U.S. Appl. No. 15/912,821, filed Mar. 6, 2018, by Yuhui Tang et al., "Designs for Multiple Perpendicular Magnetic Recording (PMR) Writers and Related Head Gimbal Assembly (HGA) Process," 49 pgs.

* cited by examiner

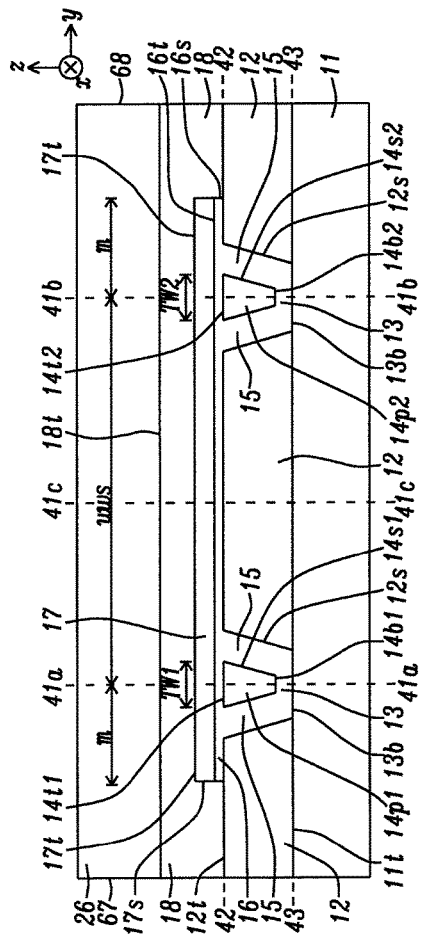
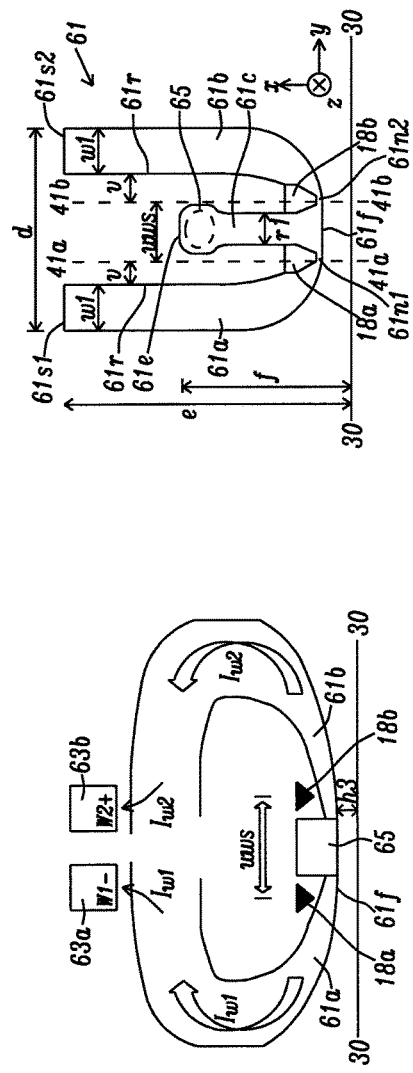
FIG. 1
FIG. 2a
FIG. 2b

MAGNETIC CORE AND COIL DESIGN FOR DOUBLE PERPENDICULAR MAGNETIC RECORDING (PMR) WRITERS

RELATED PATENT APPLICATIONS

This application is related to the following: Ser. No. 15/912,821, filing date Mar. 6, 2018; and Ser. No. 15/942,640, filing date Apr. 2, 2018; which are assigned to a common assignee and herein incorporated by reference in their entirety.

TECHNICAL FIELD

The present disclosure relates to a PMR write head that is configured to have two writers per slider, and in particular to a coil design wherein a center portion in each of the bucking coil and driving coil that carries a current to energize the main poles has a reduced cross-track width so that direct current (DC) resistance is enhanced proximate to a center plane and the air bearing surface (ABS) to enable a shift in the write gap (WG) protrusion close point up to 3 microns from the center track position thereby mitigating magnetic spacing loss for the selected writer.

BACKGROUND

Perpendicular magnetic recording has been developed in part to achieve higher recording density than is realized with longitudinal recording devices. A PMR write head typically has a main pole layer with a small surface area (pole tip) at an ABS, and coils that conduct a current and generate a magnetic flux in the main pole such that the magnetic flux exits through the pole tip and enters a magnetic medium (disk) adjacent to the ABS. Magnetic flux is used to write a selected number of bits in the magnetic medium and typically returns to the main pole through two pathways including a trailing loop and a leading loop. The trailing loop has a trailing shield structure with first and second trailing shield sides at the ABS. The second (PP3) trailing shield arches over the driving coil and connects to a top yoke that adjoins a top surface of the main pole layer near a back gap connection. The leading loop includes a leading shield with a side at the ABS and that is connected to a return path (RTP) proximate to the ABS. The RTP extends to the back gap connection (BGC) and enables magnetic flux in the leading loop pathway to return from the leading shield at the ABS and through the BGC to the main pole layer. The double write shield (DWS) design that features the leading and trailing loops was invented for adjacent track erasure (ATE) improvement by reducing stray field in side shields and in the leading shield. Accordingly, a PMR head has a great advantage over LMR in providing higher write field, better read back signal, and potentially much higher areal density.

Perpendicular magnetic recording has become the mainstream technology for disk drive applications beyond 150 Gbit/in$^r$. With the growing demand for cloud storage and cloud-based network computing, high and ultra high data rate recording becomes important for high-end disk drive applications. Thus, it is essential to design a PMR writer that can achieve high area density capability (ADC) in addition to improved stray field robustness characterized by low ATE and a bit error rate (BER) of about $10^{-6}$.

In today's PMR heads, the critical dimensions (CDs) of the PMR writer such as the track width (TW) are within a 10 nm to 100 nm range, and there may be less than 10 microns in cross-track writer-writer spacing (WWS) for a dual PMR writer at the ABS. While it is advantageous to retain the heater layout from a single PMR scheme where a first dynamic fly height (DFH) heater is in the read head, and a second DFH heater (W_DFH) is placed in the write head, the symmetric heater protrusion profile with the close-point for WG protrusion at track center in a dual PMR writer may cause magnetic spacing loss, depending on the size of WWS, which results in burnishing of the recording head. Thus, there is a need for an improved dual PMR writer design that enables better control of WG protrusion than provided by the state of the single PMR writer without having adverse thermal-mechanical implications or system level integration issues in a head gimbal assembly (HGA).

SUMMARY

One objective of the present disclosure is to provide a coil design for a dual PMR writer that enables improved control over WG protrusion when the better writer is integrated in a HGA such that the close point in a write process is shifted proximate to the cross-track position of the main pole tip in the selected writer.

Another objective of the present disclosure is to provide a method of adjusting WG protrusion for the selected writer according to the first objective so that the close point is offset from the center track position by a cross-track distance that is substantially equal to ½ of the writer-writer separation (WWS) at the ABS.

These objectives are achieved by configuring a dual PMR writer (two writers per slider) where the better of the two writers is determined during backend slider/HGA level performance testing, and is subsequently integrated into a HGA and Head-Stack Assembly (HAS) for state of the art HDDs. According to one embodiment of the coil design disclosed herein, each of the writers features a main pole in which flux is generated by flowing a current through a bucking coil and driving coil wherein a center bucking coil portion and a center driving coil portion contact an interconnect to enable opposite polarity in the magnetic flux direction. There is a WWS cross-track distance between the two main poles that is preferably less than 10 microns such that the read-write offset (RWO) in the cross-track direction at the ABS is minimized when there is a single reader or two readers at the center track position.

During a write process in the first writer, write current flows from the W1+ pad in the counter-clockwise direction within a first outer portion of the bucking coil and through the bucking coil center portion to the interconnect, and then through the driving coil center portion into a first outer portion of the driving coil wherein the current has a clockwise direction to a W1− pad thereby energizing the first magnetic core and first main pole. In the second writer, write current flows from the W2− pad in a clockwise direction within a second outer portion of the bucking coil through the bucking coil center portion to the interconnect, and then through the driving coil center portion into a second outer portion of the driving coil wherein the current has a counter-clock wise direction to the W2+ pad thereby energizing the second magnetic core and second main pole.

To provide an acceptable WWS value, the center portions of the bucking coil and driving coil have a cross-track width <WWS that enhances DC resistance (DCR) and WG protrusion. A key feature is that a narrow arm of the bucking coil proximate to the ABS, and formed between the bucking coil center portion and each bucking coil outer portion has a cross-sectional area substantially less than that of the bucking coil center portion. As a result, WG protrusion is increased in a region that extends from a center plane that is equidistant from the main poles to a cross-track position for the main pole in the selected (better performance) writer. Accordingly, the WG protrusion profile is shifted from being symmetrical with respect to the center plane to having a close point proximate to the cross-track position of the main pole tip in the better writer. Existing positions of the DFH heaters in the read head and write head are maintained at the center plane so there are no adverse consequences in the write gap protrusion/read gap protrusion ratio, and no system integration issues.

Because of the aforementioned coil design, magnetic writing functionality in each of the first and second writers is similar to that of a single writer. However, only the better writer is integrated into the HGA while the other writer is disabled.

A process flow for optimizing WG protrusion in terms of cross-track alignment with the main pole tip in the selected writer is described. The process involves measuring the cross-track W_DFH protrusion profile, measuring the write current induced protrusion (Iw-PTP) profile for various write current, overshoot, and duration parameters, and then overlaying each Iw-PTP profile on the W_DFH profile to determine the best combination to give the desired WG protrusion profile.

BRIEF DESCRIPTION OF THE DRAWINGS

FIG. 1 is an ABS view of a dual PMR writer scheme wherein two main poles have a cross-track writer-writer spacing (WWS), and share a trailing shield and leading shield at the ABS according to an embodiment of the present disclosure.

FIG. 2a shows a top-down view of a driving coil design in a dual PMR writer scheme where each writer is energized with a different write current through a separate driving coil pathway connected to a center interconnect according to an embodiment of the present disclosure.

FIG. 2b shows one embodiment of a driving coil design for FIG. 2a where a center driving coil (DC) portion contacts the center interconnect at one end, and connects with a DC first outer portion in a first writer and with a DC second outer portion in a second writer at a front side proximate to the ABS.

DETAILED DESCRIPTION

Figure 2C:
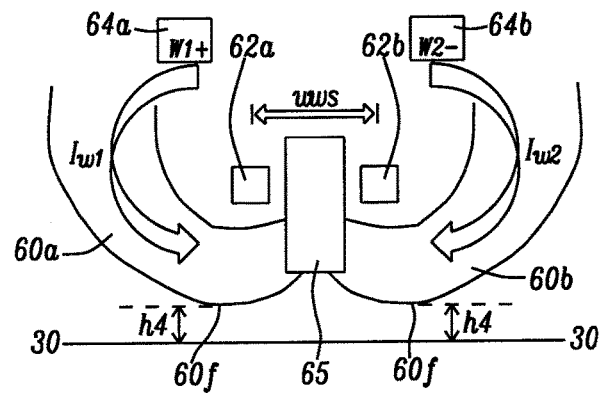
FIG. 2c shows a top-down view of a bucking coil design in a dual PMR writer scheme where each writer is energized with a different write current through a separate bucking coil pathway connected to a center interconnect according to an embodiment of the present disclosure.

The present disclosure relates to a bucking coil and driving coil design in a dual PMR writer that enables a combined cross-track WG protrusion profile for the W_DFH heater and Iw-PTP to provide a cross-track alignment of the close point with the main pole tip position for the selected (better) writer. The close point is defined as the nearest point of the dual PMR writer on the ABS to the magnetic medium during a write process. Each writer is energized with a write current through a separate circuit in outer portions of the driving coil and bucking coil, but each circuit shares a center bucking coil portion and a center driving coil portion where each center portion contacts an interconnect at one end and is proximate to the ABS at the other end. The term "bucking" is a term that may be used interchangeably with "counteracting", and the purpose of the bucking coil is to minimize inductive coupling between current in the bucking/driving coils and an overlying PP3 trailing shield that is described in a later section. In the drawings, the y-axis is a cross-track direction, the z-axis is a down-track direction, and the x-axis is in a direction orthogonal to the ABS and towards a back end of the device. Dimensions of writer components are expressed as a width in the y-axis direction, height in the x-axis direction, and thickness in the z-axis direction. The term "front side" refers to a side of a layer facing the ABS.

In FIG. 1, an ABS view is illustrated of a dual PMR writer structure where the first writer with first main pole tip 14p1 and track width TW1 is bisected by plane 41a-41a, and the second writer with second main pole tip 14p2 and track width TW2 is bisected by plane 41b-41b. Center plane 41c-41c is equidistant from planes 41a-41a and 41b-41b and is orthogonal to the ABS. First and second main pole tips are shown with a trapezoidal shape but may have different shapes in other embodiments. The first writer with main pole layer 14a having the first main pole tip is shown in a down-track cross-sectional view in FIG. 3a that is taken along plane 41a-41a. The second writer with main pole layer 14b having the second main pole tip is shown in FIG. 3b, which is a down-track cross-sectional view along plane 41b-41b. Writer-to-writer spacing (WWS) is the cross-track distance between plane 41a-41a and plane 41b-41b.

Returning to FIG. 1, the main pole layers share a common trailing shield (hot seed) layer 17, trailing shield 18, write gap 16, and leading shield 11 that is bisected by center plane 41c-41c, and each main pole tip 14p1, 14p2 is surrounded by a gap layer that comprises leading gap 13, side gaps 15, and the write gap. In one embodiment, hot seed layer side 17s and write gap side 16s are coplanar and formed a distance m from plane 41a-41a in the first writer, and an equivalent distance m from plane 41b-41b in the second writer. First and second main pole tips have sides 14s1 and 14s2, respectively, and top edges (of trailing sides) 14t1 and 14t2, respectively, which are formed at plane 42-42 that also includes a top surface 12t of side shield layers 12. First and second main pole tips also comprise bottom edges (of leading sides) 14b1, 14b2, respectively. Leading shield 11 has a top surface 11t at plane 43-43 which also includes a bottom surface of the leading gap. Plane 42-42 and plane 43-43 are parallel to each other and are orthogonal to the center plane and to the ABS. Side gaps adjoin inner sides 12s of the side shields. In the exemplary embodiment, PP3 trailing shield 26 contacts a top surface of trailing shield layer 18 at the ABS. However, in other embodiments, the PP3 trailing shield may be recessed behind the ABS. Trailing shield layer 18 contacts HS layer side 17s and top surface 17t, and write gap side 16s, and adjoins side shields 12 at plane 42-42. The all wrap around (AWA) shield design has outer sides 67, 68, and features side shields that adjoin the leading shield at plane 43-43.

In all embodiments, WWS is preferably less than 10 microns so that the read-write offset also known as RWO (sensor—main pole tip 14p1 spacing, and sensor—main pole tip 14p2 spacing) in the cross-track direction at the ABS is minimized. Smaller RWO means less track misregistration and better ADC potential. For example, if the sensor 6 (FIG. 3c) is centered at center plane 41c-41c, then RWO is effectively equal to ½ WWS at 0° skew. If RWO becomes too large, thermal-mechanical behavior of the dual PMR writer will deviate significantly from conventional single PMR writers. In particular, it is important to maintain the WG protrusion/read gap (RG) protrusion ratio and DFH heater placement found in current writers to avoid a substantial redesign of the dual PMR writer structure. As RWO increases, WG protrusion decreases at the center plane thereby increasing the risk of exposing the sensor to mechanical damage.

Referring to FIG. 2a and FIG. 2c, a general scheme is provided for write current flow in a dual PMR writer according to an embodiment of the present disclosure. At the driving coil level in FIG. 2a, there is a WWS distance between a trailing shield portion 18a (at plane 41a-41a) in the first writer and a trailing shield (TS) portion 18b (at plane 41b-41b) in the second writer. Similarly, at the bucking coil level in FIG. 2c, there is a WWS distance in the cross-track direction between a center of a back gap connection (BGC) 62a in a first writer and a center of BGC 62b for a second writer. WWS also represents the distance between the midpoints of a first main pole layer having a back portion formed on BGC 62a and below TS portion 18a, and a second main pole layer having a back portion formed on BGC 62b and below TS portion 18b.

When the write gate in the preamp of the HGA (shown in FIG. 4) is switched to "ON", write current $I_{w1}$ flows in a first circuit (FIG. 2c) from W1+ pad 64a in a counter-clockwise direction through bucking coil 60a to interconnect 65 and then in a clockwise direction from the interconnect through driving coil 61a to W1− pad 63a (FIG. 2a) to energize the magnetic core comprised of TS shield portion 18a and the underlying first main pole layer (not shown) in the first writer. Alternatively, when writing with the second writer, write current $I_{w2}$ flows in a second circuit from W2− pad 64b in a clockwise direction (FIG. 2c) through bucking coil 60b to interconnect 65 and then in a counter-clockwise direction through driving coil 61b to W2+ pad 63b (FIG. 2a) thereby energizing TS shield portion 18b and the underlying second main pole layer (not shown). Driving coil 61a (or 61b) has a front side 61f that is recessed at height h3 from the ABS while bucking coil 60a (or 60b) has a front side 60f that is recessed at height h4 from the ABS.

Referring to FIG. 2b, one embodiment of a driving coil design according to the present disclosure is shown with a driving coil 61 having a substantially U shape with an inner side 61r on a first outer portion 61a that is a cross-track distance v from plane 41a-41a, and inner side 61r on a second outer portion 61b that is a cross-track distance v from plane 41b-41b. A backside 61e of driving coil center portion 61c is at height f from the ABS 30-30 while backsides 61s1, 61s2 of outer portions 61a, 61b, respectively, are at height e from the ABS where e>f. The width of the driving coil is d which means the footprint of the driving coil in the (x, y) plane is essentially d×e. Outer portions of the driving coil have a width w1 which is typically greater than width r1 of center portion 61c. Moreover, width r1 is preferably less than WWS. In some embodiments (not shown), outer portions 61a, 61b may have a substantially greater width proximate to back ends 61s1, 61s2 than in a region between front side 61f and height f such that inner sides 61r cross planes 41a-41a and 41b-41b, respectively.

Figure 2D:
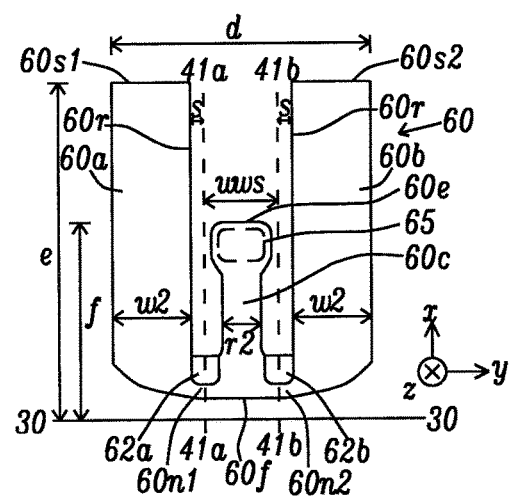
FIG. 2d shows one embodiment of a bucking coil design for FIG. 2c where a center bucking coil (BC) portion contacts the center interconnect at one end, and connects with a BC first outer portion in a first writer and with a BC second outer portion in a second writer at a front side proximate to the ABS.

In FIG. 2d, one embodiment of a bucking coil design according to the present disclosure is depicted with bucking coil 60 having a substantially U shape with an inner side 60r on a first outer portion 60a with a cross-track distance s from plane 41a-41a, and an inner side 60r on second outer portion 60b with a cross-track distance s from plane 41b-41b. A backside 60e of bucking coil center portion 60c is at height f from the ABS 30-30 while backsides 60s1, 60s2 of outer portions 60a, 60b, respectively, are at height e from the ABS. The width of the bucking coil is d, which provides a similar footprint in the (x, y) plane to that of the driving coil. Thus, both of the driving coil and bucking coil designs have a cross-track width d and height e similar to that of a single PMR writer so that thermal-mechanical behavior (WG/RG protrusion ratio) does not deviate from conventional writers. Outer portions of the bucking coil have a width w2, which is typically greater than width r2 of center portion 60c. Width r2 of bucking coil center portion 60c is preferably less than WWS. In some embodiments (not shown), outer portions 60a, 60b may have a substantially greater width proximate to back ends 60s1, 60s2, respectively, than in a region between front side 61f and height f.

Another key feature (FIG. 2b) is the driving coil arm 61n1 formed between driving coil center portion 61c and first outer portion 61a, and driving coil arm 61n2 formed between the driving coil center portion and second outer portion 61b. The center portion has a substantially rectangular shape aligned orthogonal to front side 61f. However, the center portion has a cross-track width that may be greater at end 61e to enable contact with an entire top surface of interconnect 65. Note that the cross-sectional area of each arm 61n1, 61n2 is substantially smaller than that of center portion 61c, which means there will be higher DCR in the driving coil arms than in the driving coil center portion.

Similarly, bucking coil arm 60n1 in FIG. 2d is formed between bucking coil center portion 60c and first outer portion 60a while bucking coil arm 60n2 is formed between the bucking coil center portion and second outer portion 60b. The center portion is substantially rectangular in shape and aligned orthogonal to front side 60f. However, the center portion has a cross-track width that may be greater at end 60e to enable contact with an entire bottom surface of interconnect 65. Furthermore, the cross-sectional area of each arm 60n1, 60n2 is substantially less than that of the bucking coil center portion. The driving coil arms and bucking coil arms may have a height k1, k2, respectively, that are shown in FIGS. 3a, 3b, respectively, where k2>k1 and each of k1 and k2 may be around 1 micron.

Since k1 and k2 are substantially less than r1 and r2, which are generally 3-5 microns, and the thickness of each of the bucking coil and driving coil is essentially uniform between the front side and backsides thereof, the smaller cross-sectional area of the bucking coil and driving coil arms is advantageously used to cause higher DCR in the arms than in other portions of the bucking coil and driving coil. Accordingly, there is a greater WG protrusion between center plane 41c-41c and plane 41b-41b when the second writer is energized because of enhanced heating from greater DCR in arms 61n2, 60n2. When the first writer is energized with a write current, there is greater WG protrusion between the center plane and plane 41a-41a because of enhanced heating from higher DCR in arms 61n1, 60n1. In some embodiments, DCR may be increased from 1 ohm in conventional bucking coils and driving coils to 2 ohms in the narrow arms 60n1, 60n2, 61n1, 61n2 and in other portions of the bucking coil 60 and driving coil 61 proximate to front sides 60f and 61f, respectively.

As explained later, the asymmetry of the bucking coil and driving coil portions in the first circuit or second circuit is exploited to generate enhanced Iw-PTP that is responsible for shifting the WG protrusion close point during a write process from the center plane to a position proximate to plane 41a-41a or proximate to plane 41b-41b depending on whether the first or second writer is selected as the better writer and thereafter incorporated into the HGA. The process of optimizing Iw-PTP so that the overlay of the W_DFH cross-track profile with the Iw-PTP profile provides the desired shift in the close point location is described in a later section.

Figure 3A:
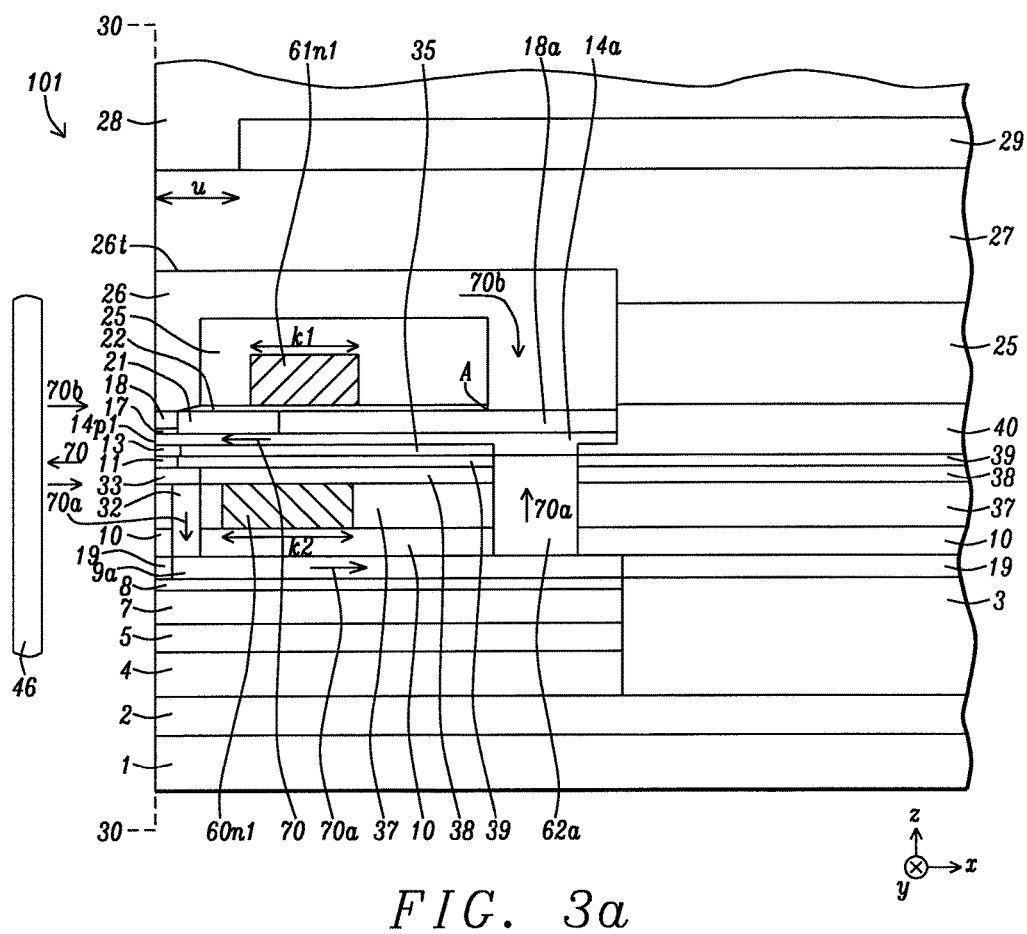
FIGS. 3a-3b are down-track cross-sectional views of the first and second writers, respectively, in FIGS. 2b, 2d along a plane that bisects the first main pole layer (FIG. 3a), and along a plane bisecting the second main pole layer (FIG. 3b).
Figure 3B:
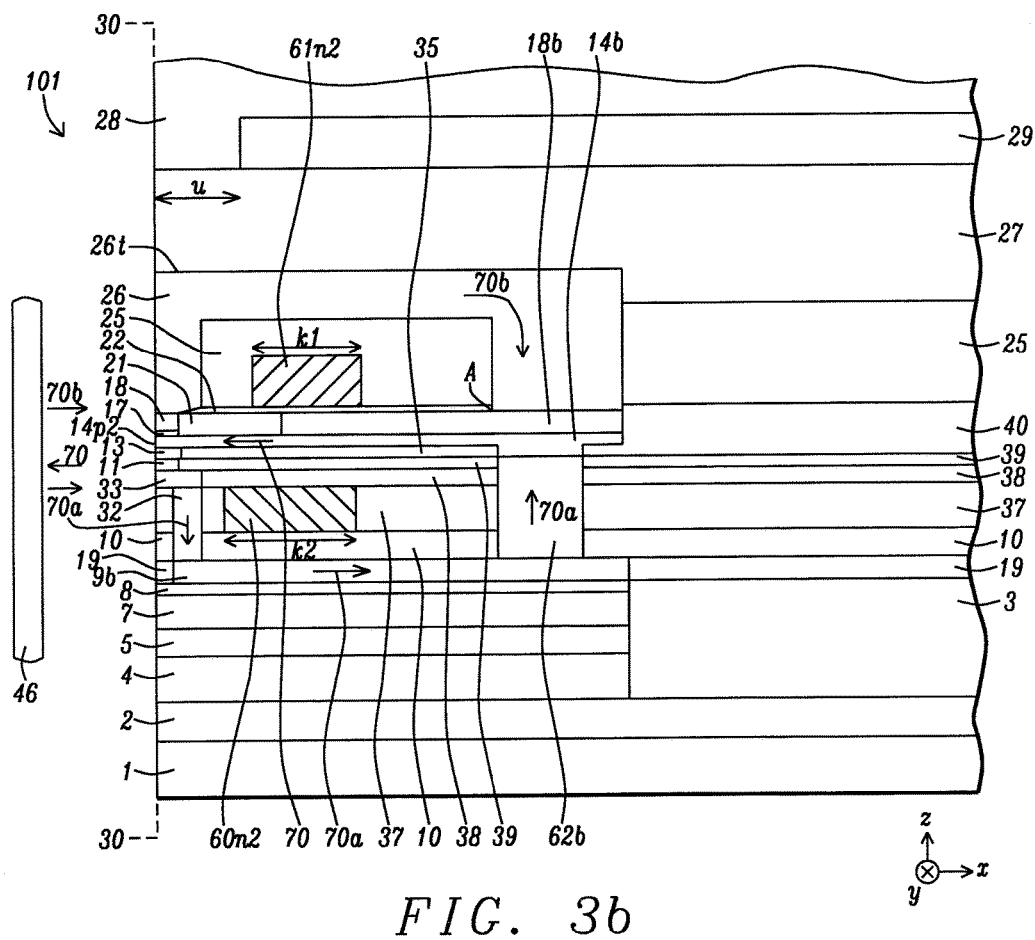

Referring to FIG. 3a, a combined read/write head 101 according to one embodiment of the present disclosure is shown at plane 41a-41a in FIG. 1. The combined read/write head is formed on a substrate 1 that may be comprised of AlTiC (alumina+TiC). Those skilled in the art will recognize that layers 2-8 represent the read head portion of the recording device while overlying layers represent the first writer in the dual PMR structure described earlier. The substrate is typically part of a slider (not shown) formed in an array of sliders on a wafer. After the combined read/write head structure is completed, the wafer is sliced to form rows of sliders. Each row is typically lapped to afford an ABS before dicing to fabricate individual sliders for a HDD.

The present disclosure anticipates that one or more dynamic fly height (DFH) heater elements (not shown) may be formed in one or more insulation (dielectric) layers in the PMR writer structure to control the extent of thermal expansion (protrusion) along the ABS 30-30 toward a magnetic medium 46 during a read or write process. Read gap (RG) and write gap (WG) protrusion may be tuned by the placement of the one or more DFH heater elements, and by the choice of metal or alloy selected for the DFH heater elements since each DFH heater resistor material has a particular thermal and mechanical response to a given electrical input. Usually, the RG protrusion/WG protrusion ratio (gamma ratio) is around 1 to provide the best read/write performance and reliability. The DFH heater in the writer known as the W_DFH heater is typically positioned in one or more of the dielectric layers 38-40 behind top yoke 18a and BGC 62a while the DFH heater in the read head may be formed within dielectric layer 3, for example.

A first insulation layer 2 that may be comprised of alumina or another dielectric material is disposed on substrate 1. There is a second insulation layer 3 formed on the first insulation layer and behind the read head layers 4-8. Above layer 2 is the S1 shield 4 that is comprised of NiFe or CoFeNi or the like, and extends from the ABS toward a back end of the read head. A read gap 5 is formed between the S1 shield 4 and S2A shield 7. A magnetoresistive element or sensor 6 (FIG. 3c) is formed in the read gap 5 along the ABS 30-30 and typically includes a plurality of layers (not shown) in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media. Resistance across the read gap changes as the moment in the second ferromagnetic layer rotates. A "0" or "1" magnetic state can be defined depending on whether the two ferromagnetic layers are magnetically aligned in the same direction or in an antiparallel fashion. The non-magnetic layer in the sensor 6 may be an insulator such as MgO in a tunneling magnetoresistive (TMR) sensor.

Magnetic layer 7, insulation layer 8, and return path (RTP) 9a are sequentially formed on the read gap 5. In some embodiments, the RTP serves as the S2B shield in the read head while magnetic layer 7 is the S2A shield. In other embodiments, magnetic layer 7 is a top read shield layer having a stack represented by S2A shield/insulation layer/S2B shield. S2A and S2B layers may be made of the same magnetic material as in the S1 shield 4. Although RTP 9a is recessed from the ABS and formed within insulation layer 19, the RTP may serve as a flux return pathway in the writer by magnetically connecting S2C 32 with back gap connection (BGC) 62a in leading loop pathway 70a that includes leading shield 11, leading shield connector (LSC) 33, shield section (S2C) 32, the RTP, and the BGC.

A bottom portion of BGC 62a contacts a top surface of RTP 9a, and a top BGC surface contacts a back portion of the bottom surface of main pole 14a. In the exemplary embodiment, there is a first insulation layer 10 formed on the RTP and adjoining the sides of S2C 32, and contacting the sides of a bottom portion of the BGC. A second insulation layer 37 is formed on the first insulation layer and has the first bucking coil comprised of arm 60n1 formed within. Bucking coil 60 is completely displayed in the top-down view in FIG. 2d. The bucking coil is wound in series with an opposite polarity to that in the driving coil 61 in FIG. 2a to minimize direct coupling between the trailing shield 18 and driving coil.

Returning to FIG. 3a, a third insulation layer 38 is formed on insulation layer 37 behind LSC 33 and a fourth insulation layer 39 is on insulation layer 38 behind leading shield 11. Generally, insulation layers 10, 37-39 have a combined thickness essentially equal to that of BGC 62a. The LSC, S2C 32, BGC, and RTP 9a may be made of NiFe, CoFe, CoFeNi or the like with a saturation magnetization value of 10 kiloGauss (kG) to 16 kG.

There may be a bottom yoke 35 behind lead gap 13 and with a thickness essentially equal to that of the lead gap. Above the bottom yoke is the main pole layer 14a (with main pole tip 14p1 at the ABS 30-30) that may be comprised of NiFe, CoFe, CoFeNi, or CoFeN, and is preferably a 19 kG or 24 kG material. The first main pole 14a has a back portion that connects with a top surface of BGC 62a to complete the leading loop. Leading shield (LS) 11 is separated from the first main pole by lead gap 13. Flux 70 from the main pole enters magnetic medium 46 during a write process and returns in part as flux 70a though the leading loop comprised of LS 11, LSC 33, S2C 32, RTP 9a, and the BGC.

A first trailing shield (TS) layer 17 also known as the hot seed layer has a bottom surface formed on a write gap (not shown) at the ABS and extends a throat height distance away from the ABS 30-30 to an ABS facing (front) side of non-magnetic layer 21. A second TS layer 18 also extends from the ABS to layer 21, and like the first TS layer, may be made of CoFeN, CoFeNi, NiFe, or CoFe and is part of the trailing loop. The trailing loop for flux 70b to return to first main pole 14a further includes a third trailing shield portion named PP3 trailing shield 26 that arches over the driving coil including arm 61n1 to connect with a back portion 18a of the second TS layer above the first main pole back portion. TS layers 18, 18a and the PP3 trailing shield are typically made of materials with a 16 kG to 19 kG magnetic saturation value. TS layer 18a (and 18b in FIG. 3b) are sometimes referred to as top yokes, and each has a backside at point A that touches the inner corner of PP3 TS 26. Insulation layer 22 is formed on a portion of the non-magnetic layer 21 and top yoke.

Although PP3 trailing shield 26 arches over driving coil arm 60n1 with a dome shape, the PP3 trailing shield may have a substantially flat top surface in other designs. An insulation layer 25 is formed on the insulation layer 22 and fills the openings between the driving coil 60 (shown in FIG. 2b) and the PP3 trailing shield. A protection layer 27 covers the PP3 trailing shield and is made of an insulating material such as alumina. Above the protection layer and recessed a certain distance from the ABS 30-30 is an optional cover layer 29 that is preferably comprised of a low CTE material such as SiC that serves to reduce the WG protrusion rate. SiC cover layer is recessed a distance u to avoid introducing a material at the ABS with different mechanical/etch resistance properties than adjacent layers that could adversely affect back end lapping and ion beam etching processes. Overcoat layer 28 is formed as the uppermost layer in the writer.

The dual flux return pathway in FIG. 3a is employed to reduce STE. Typically, about 50% of flux returns through leading loop 70a and about 50% through trailing loop 70b.

Referring to FIG. 3b, the second writer in the combined read/write head 101 of the present disclosure is shown with a down-track cross-sectional view at plane 41b-41b in FIG. 1. All layers are retained from FIG. 3a except the first main pole 14a is replaced by second main pole 14b, bucking coil arm 60n2 is formed within insulation layer 37 proximate to the ABS 30-30, and driving coil arm 61n2 is formed within insulation layer 25. The leading loop is comprised of leading shield 11, LSC 33, S2C 32, RTP 9b, and BGC 62b. The trailing loop includes first TS layer 17, second TS layer 18, PP3 trailing shield 26, and a back portion (top yoke) 18b of the second TS layer above a back portion of the second main pole. It should be understood that the shapes for the BGCs, trailing shield structure, and coils are not limited to those depicted in FIG. 2b and FIG. 2d. In other words, the shapes for the magnetic core including main poles and top and bottom yokes, driving coil, and bucking coil may be altered to optimize performance for PMR writer requirements that vary from one product to the next.

Figure 3C:
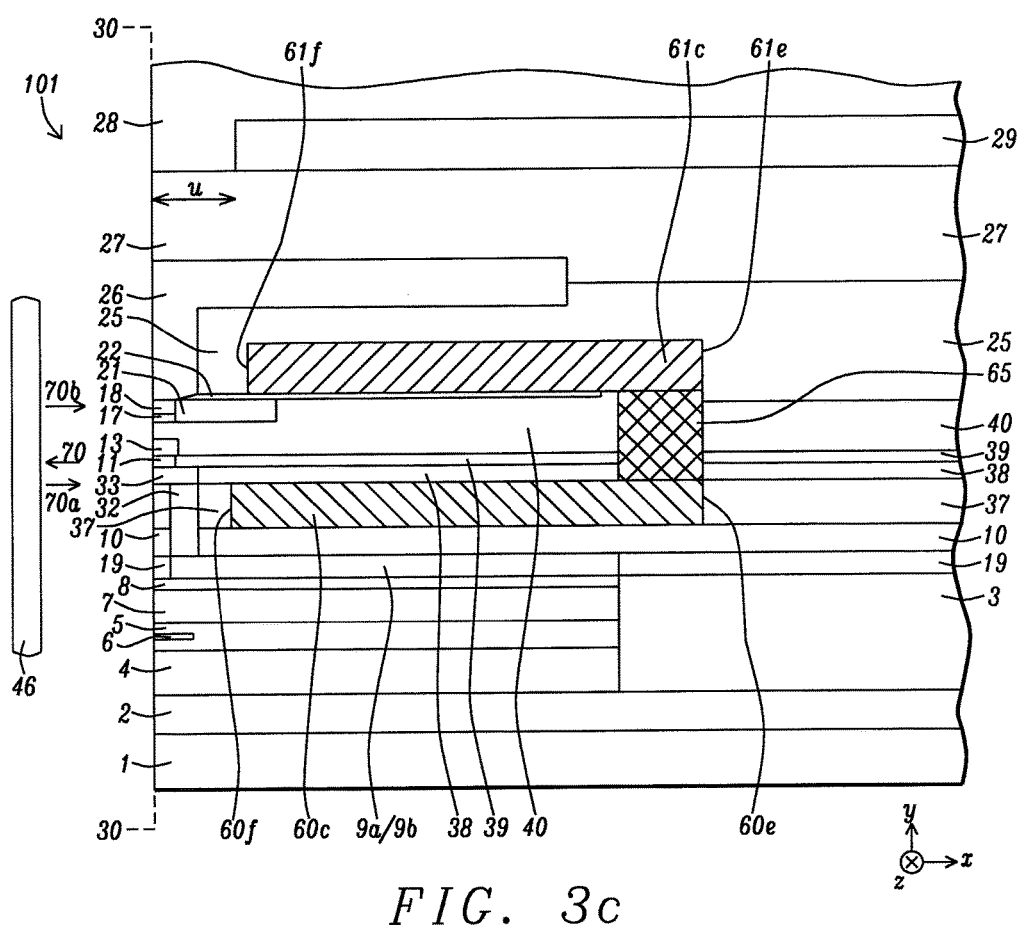
FIG. 3c is a down-track cross-sectional view along a center plane midway between the first writer in FIG. 2b and the second writer in FIG. 2d.

Referring to FIG. 3c, a down-track cross-sectional view along center plane 41c-41c in FIG. 1 is illustrated according to an embodiment of the present disclosure. Note that the trailing shield structure including PP3 trailing shield 26 is present along with leading shield structure including LSC 33, S2C 32, and RTP 9a/9b. However, TS layer 18a/18b and the BGC are absent at the center plane where the first writer adjoins the second writer. Driving coil center portion 61c is shown with front side 61f and backend 61e, and bucking coil center portion 60c is pictured with front side 60f and backend 60e. Interconnect 65 adjoins a bottom surface of center portion 61c proximate to backend 61e, and contacts a top surface of center portion 60c proximate to backend 60e. A W_DFH heater (not shown) may be placed in one or more of the dielectric layers 38-40 proximate to a backside of interconnect 65. There may also be a second DFH heater (not shown) in the read head portion such as in dielectric layer 3, for example.

Figure 4:
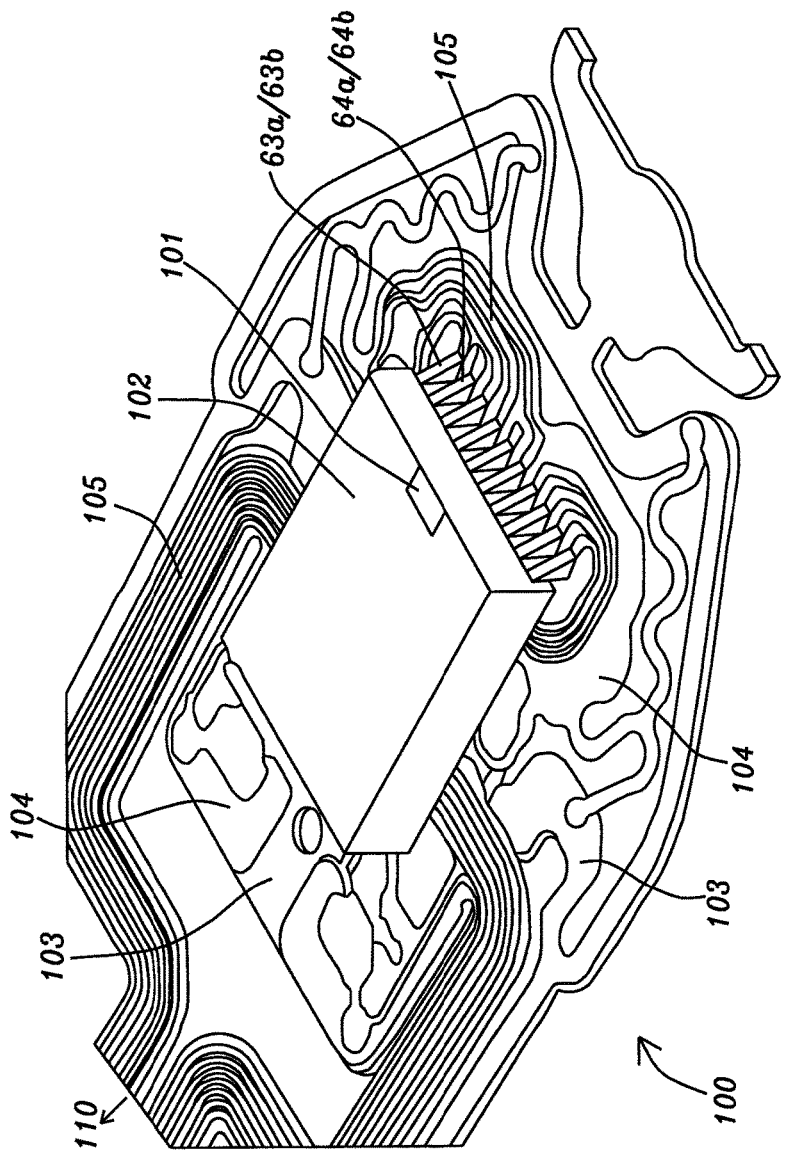
FIG. 4 is an oblique view of a slider on which a combined read/write head structure is mounted, and having adjoining pads and trace lines (wiring) formed on a suspension according to an embodiment of the present disclosure.

Referring to FIG. 4, HGA 100 is depicted and features suspension 103, an overlying dielectric layer 104, and slider 102 formed thereon. The combined read/write head 101 comprised of the dual PMR writer of the present disclosure adjoins a top side of the slider facing away from the suspension. Pads including W1− pad 63a, W1+ pad 64a, W2+ pad 63b and W2− pad 64b are attached to slider side 102s. Trace lines 105 connect the plurality of pads to preamp 110. However, only the W1+ and W1− pads are connected to the preamp if the first writer is found to have better performance. Likewise, only the W2+ and W2− pads are connected to the preamp if the second writer has better performance. Connections between the pads and the combined read/write head are within the slider and not visible from this view.

Figure 5:
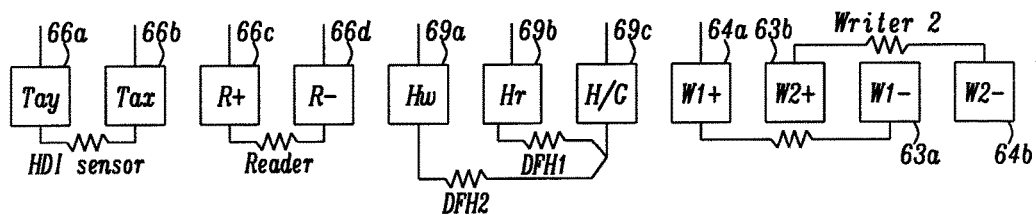
FIG. 5 is diagram showing one possible configuration for the plurality of pads on the slider in FIG. 4.

In FIG. 5, one embodiment of the pad layout is shown for a combined read/write head 101 having a single reader and a dual writer according to the present disclosure. Pads interface the writers, reader, two DFH heaters, and contact (HDI) sensors to the driving circuits through the trace lines in the HGA described previously. Pads 66a-66b control the contact sensor function, pads 66c-66d control the reader function, and pads 69a-69c are used to manage the two DFH heaters. After the better of the two writers is selected, only the first circuit comprised of pads 63a, 64a or the second circuit comprised of pads 63b, 64b is connected to trace lines 105a, 105b (FIG. 4) while the other of the first circuit or second circuit is disabled depending on whether the first writer or the second writer, respectively, has better performance. Accordingly, the total number of pads is nine when a dual independent DFH heater mode is employed as shown in FIG. 5. Alternatively, there may be a parallel DFH heater mode (not shown) where the total number of pads is only 8.

As mentioned previously, when track width (TW) shrinks below 100 nm for a single writer, there is often considerable variation in performance from one writer to the next for a given target TW. We have found the mean ADC is improved by 2.4% and the sigma is tightened by 35.2% for the better writer in the dual PMR writer of the present disclosure compared with a single writer.

It should be understood that in the final device, only one of the two writers (that has a better performance during backend testing) is integrated into a HGA for customer use. The other writer remains in the device but the first circuit comprising pads W1+/W1− is disabled if the second writer has better performance, or the second circuit comprising pads W2+/W2− is disabled when the first writer has better performance. The method of selecting the better writer in a dual PMR writer scheme is described in detail in related patent application 15/912,821.

The present disclosure also encompasses a method of optimizing the cross-track protrusion profile of the dual PMR writer disclosed herein such that the close point is aligned with the cross-track position of the main pole tip in the selected writer. Therefore, if the first writer with main pole tip 14p1 in FIG. 1 is selected for integration in a HGA, the close point during a write process is proximate to plane 41a-41a at the ABS. On the other hand, if the second writer with main pole tip 14p2 is selected for integration in a HGA, the close point during the write process is proximate to plane 41b-41b. A key feature is that heating from both of the W_DFH heater and portions of the bucking coil and driving coil proximate to the ABS contribute to overall WG protrusion. It is believed that about 90% of WG protrusion results from W_DFH heating and around 10% of WG protrusion is caused by Iw-PTP or heat induced protrusion resulting from DCR in the bucking coil and driving coil.

Figure 6:
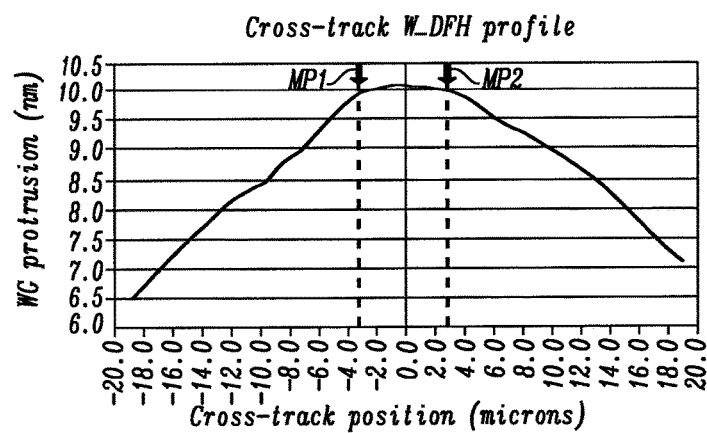
FIG. 6 is a write DFH heater protrusion profile in a cross-track direction for a dual PMR structure where write current protrusion (Iw-PTP) is effectively zero.

Referring to FIG. 6, a measurement of cross-track W_DFH profile shows the W_DFH heater contribution to WG protrusion in the absence of a write current. The W_DFH heater (not shown) may be placed behind interconnect 65 (FIG. 3c) and centered at plane 41c-41c such that heat induced protrusion is essentially symmetrical with the center cross-track position (FIG. 6) corresponding to plane 41c-41c in FIG. 1. However, the present disclosure is not limited to a particular W_DFH heater position. Arrows represent the cross-track positions of the first main pole tip (MP1) in the first writer, and the second main pole tip (MP2) in the second writer. WG protrusion at the MP1 and MP2 positions is around 0.2 nm less than the maximum protrusion at the center cross-track position and this difference is referred to as magnetic spacing loss. Even when the Iw-PTP profile from a conventional writer coil is added to the W_DFH profile, it is likely that magnetic spacing at the MP1 and MP2 positions is still suffering a loss. Accordingly, with conventional dual PMR writers, there is an expected degradation in writing transition quality and consequential ADC performance loss when one of the first writer and second writer is selected as the better writer to be integrated in a HGA.

Figure 7:
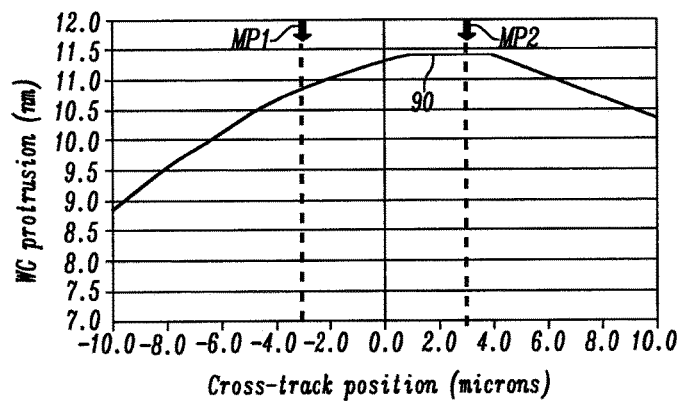
FIG. 7 is a plot of cross-track position vs. WG protrusion when the Iw-PTP cross-track profile is overlaid on the W_DFH profile in FIG. 6 thereby shifting the close point location to a cross-track position that is proximate to a main pole tip cross-track position in the selected writer according to an embodiment of the present disclosure.

In FIG. 7, a simulated WG protrusion profile is shown where the Iw-PTP profile generated by sending a write current Iw2 through the second circuit (FIGS. 2b, 2d) in the dual PMR writer of the present disclosure is superimposed on the W_DFH profile from FIG. 6. It should be understood that the simulation process comprises generating an Iw-PTP profile with a plurality of different write currents, overshoot, and duration parameters, and then selecting the Iw-PTP profile that when overlaid on the W_DFH profile provides the desired cross-track alignment of close point to MP2 position. Thus, when the second writer is selected as the better writer for integration in a HGA and the MP2 cross-track position is 3 microns from center track as in the example, the maximum WG protrusion is preferably at the same 3 micron cross-track position. Typically, the maximum WG protrusion is in the form of a plateau 90 that encompasses a cross-track distance of up to 1 or 2 microns.

Figure 8:
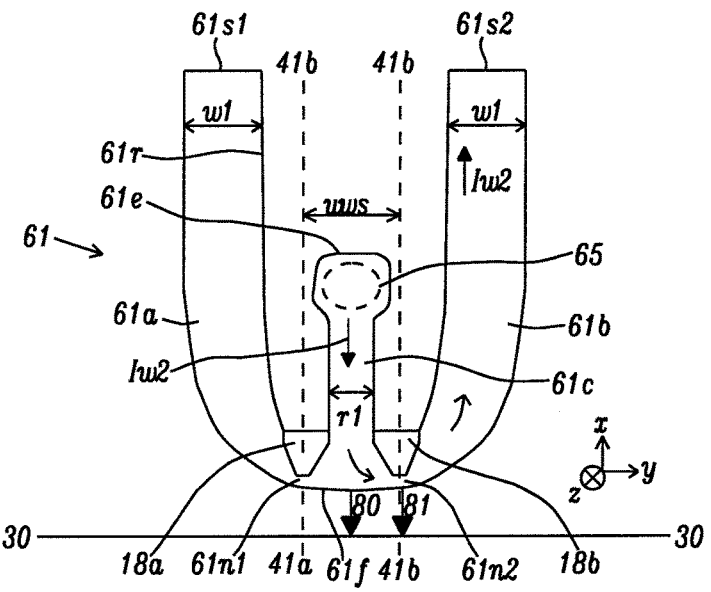
FIG. 8 is a top-down view showing write current induced protrusion in a first writer of a dual PMR writer as a result of enhanced DCR in a center portion of a driving coil and in a narrow arm connecting the driving coil center portion with a driving coil outer portion proximate to the ABS.

Referring to FIG. 8, during a write process according to an embodiment of the present disclosure where write current Iw2 flows from interconnect 65 through a second circuit to driving coil end 61s2, Iw-PTP from driving coil 61 is derived primarily from center portion 61c that causes protrusion 80 centered about midway between plane 41a-41a and plane 41b-41b at the ABS 30-30, and from adjoining arm 61n2 wherein DCR induces protrusion 81 centered proximate to plane 41b-41b in an embodiment where the second writer with second main pole tip 14p2 (FIG. 3b) is selected as the better writer. Note that driving coil outer portion 61b has a substantially greater cross-track width than the center portion (w1>r1) which means DCR heat induced protrusion from the outer portion at the ABS will be less than that provided by the center portion. However, outer portion 61b will generate a certain amount of Iw-PTP (not shown) to the right of arrow 81 when write current Iw2 passes through the second circuit described previously.

Figure 9:
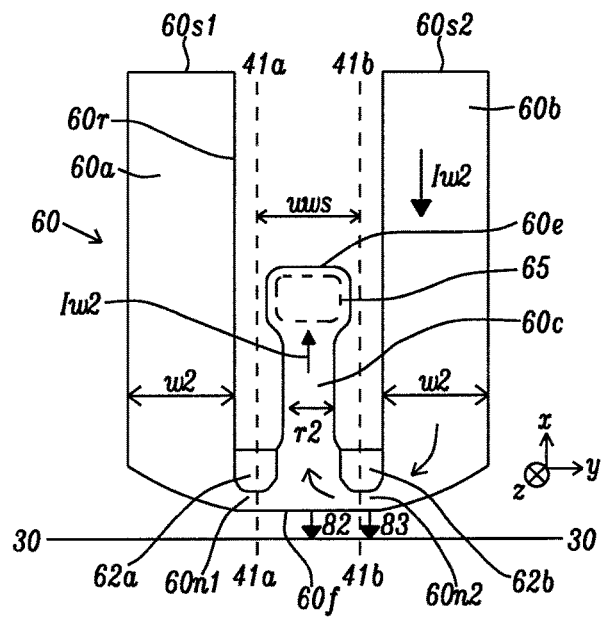
FIG. 9 is a top-down view showing write current induced protrusion in the first writer in FIG. 8 as a result of enhanced DCR in a center portion of a bucking coil and in a narrow arm connecting the bucking coil center portion with a bucking coil outer portion proximate to the ABS.

Referring to FIG. 9, the write process described with regard to FIG. 8 also comprises write current Iw2 from the W2− pad (not shown) that flows through bucking coil 60 to interconnect 65. Iw-PTP from the bucking coil is derived primarily from center portion 60c that causes protrusion 82 centered about midway between plane 41a-41a and plane 41b-41b at the ABS 30-30, and from adjoining arm 60n2 wherein DCR induces protrusion 83 centered proximate to plane 41b-41b. Bucking coil outer portion 60b also generates a certain amount of Iw-PTP (not shown) to the right of arrow 83 when write current Iw2 passes through the second circuit described previously. In the exemplary embodiment where the cross-sectional area of arm 61n2 is less than that of arm 60n2 because k1<k2 in FIG. 3b, the greater amount of Iw-PTP and DCR is generated by driving coil 61 (arm 61n2 and center portion 61c) and a lesser amount by the bucking coil (arm 60n2 and center portion 60c) when r1 is substantially equal to r2.

Figure 10:
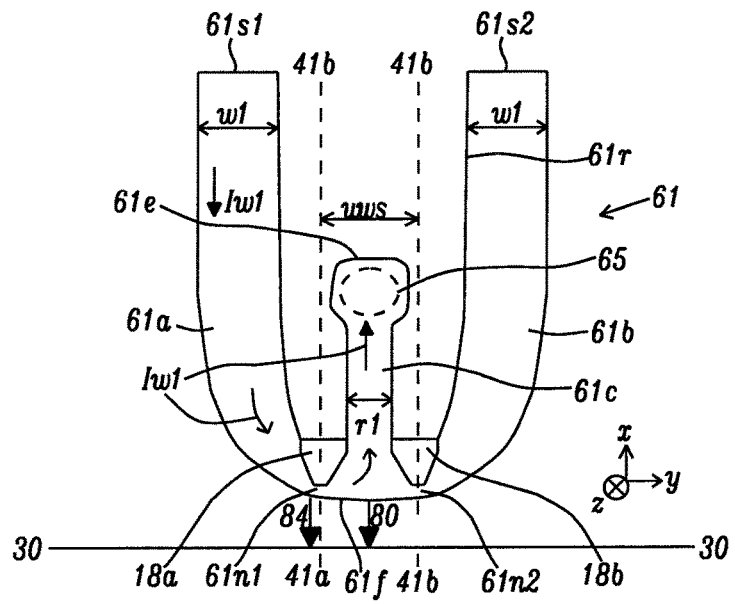
FIG. 10 is a top-down view showing write current induced protrusion in a second writer of a dual PMR writer as a result of enhanced DCR in a center portion of a driving coil and in a narrow arm connecting the driving coil center portion with a driving coil outer portion proximate to the ABS.

In an alternative embodiment shown in FIG. 10 where the first writer is selected as the best writer in the dual PMR writer structure and integrated into a HGA while the second writer is disabled in the HGA, a write process according to an embodiment of the present disclosure comprises write current Iw1 from the W1+pad (not shown) flowing through a first circuit in the driving coil 61 to interconnect 65. Accordingly, Iw-PTP from the driving coil is generated primarily from center portion 61c that causes protrusion 80 centered about midway between plane 41a-41a and plane 41b-41b at the ABS 30-30, and from adjoining arm 61n1 wherein DCR induces protrusion 84 is centered proximate to plane 41a-41a. Furthermore, outer portion 61a will generate a certain amount of Iw-PTP (not shown) to the left of arrow 84 when write current Iw1 passes through the first circuit.

Figure 11:
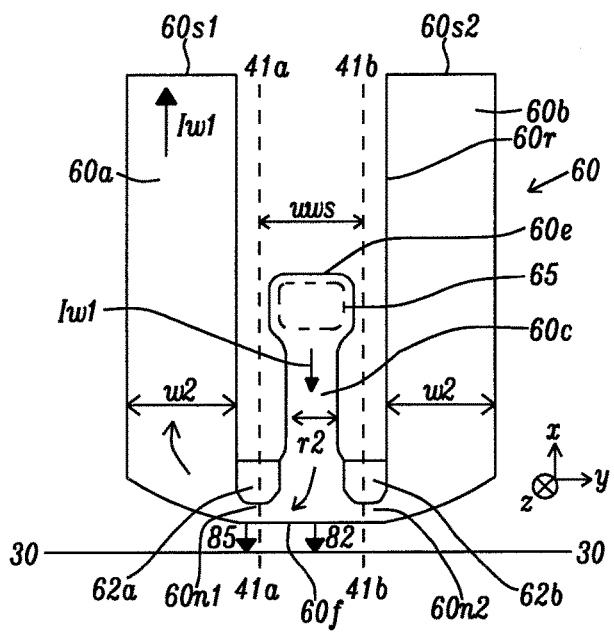
FIG. 11 is a top-down view showing write current induced protrusion in the second writer in FIG. 10 as a result of enhanced DCR in a center portion of a bucking coil and in a narrow arm connecting the bucking coil center portion with a bucking coil outer portion proximate to the ABS.

Referring to FIG. 11, the write process described with regard to FIG. 10 also comprises write current Iw1 from interconnect 65 that flows through bucking coil 60 to bucking coil end 60s1. Iw-PTP from the bucking coil is derived primarily from center portion 60c that causes protrusion 82 centered about midway between plane 41a-41a and plane 41b-41b at the ABS 30-30, and from adjoining arm 60n1 wherein DCR induces protrusion 85 centered proximate to plane 41a-41a. Bucking coil outer portion 60a also generates a certain amount of Iw-PTP (not shown) to the left of arrow 85 when write current Iw1 passes through the first circuit described previously.

Figure 12:
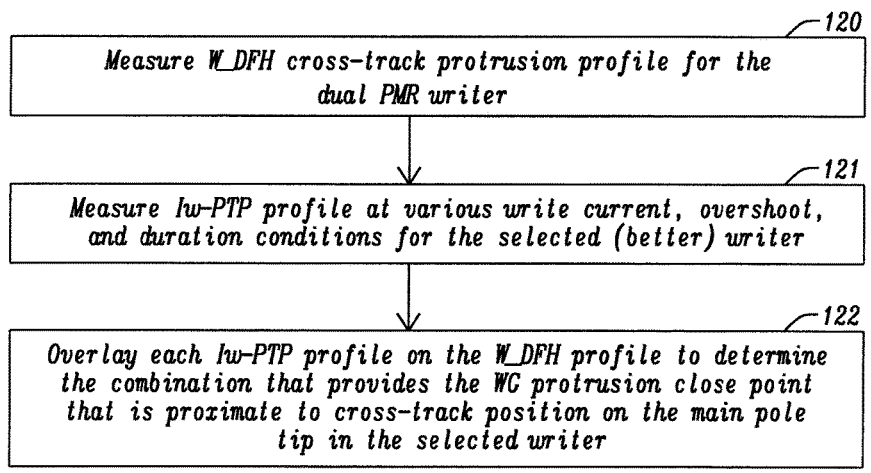
FIG. 12 is a flow diagram showing a process of optimizing writer induced WG protrusion in a dual PMR writer such that an overlay of the writer induced WG protrusion in the better writer on the DFH heater protrusion profile results in a close point proximate to the cross-track position of the main pole tip in the better writer.

Referring to FIG. 12, a flow diagram is provided for optimizing the alignment of the close point during a write process to the cross-track position of the main pole tip in the selected writer. Step 120 involves measuring the W_DFH protrusion profile for the dual PMR writer when there is no write current flowing through either the first circuit or the second circuit. Generally, step 120 comprises picking a voltage proximate to the expected voltage to be used to operate the W_DFH heater in the final device. Thereafter, in step 121, the Iw-PTP profile is simulated with a plurality of write currents, overshoot conditions, and write current durations. In step 122, each of the Iw-PTP profiles from the preceding step is overlaid on the W_DFH protrusion profile to give a plot similar to that shown in FIG. 9. The overlay (combined) protrusion profile that provides the best match in terms of alignment of maximum WG protrusion to the main pole tip position (MP1 14$p$1 or MP2 14$p$2) of the better writer is used to determine which write current, overshoot, and duration will be employed during a write process with the selected writer. The protrusion profiles may be measured with a scanning Laser Doppler Vibrometer (sLDV). In some embodiments, where DCR in portions of the bucking coil and driving coil proximate to the ABS is about twice as large as in conventional writers (i.e. 2 ohms vs. 1 ohm), the desired alignment of close point to MP2 (or MP1) position is realized and the selected writer performance is optimized for ADC and write transition quality.

Since the overall footprint (d and e dimensions in FIG. 2$b$ and FIG. 2$d$) of the bucking coil and driving coil is maintained in the dual PMR writer disclosed herein compared with a single writer, thermal-mechanical behavior is substantially the same as in state-of-the-art writers, and HDD applications in all mobile, near line, and high-end segments are maintained with essentially equal performance and reliability. Moreover, the asymmetry of the portions in each of the driving coil and bucking coil that are employed in the first circuit or second circuit to energize the first writer or second writer, respectively, ensure that the net Iw-PTP profile is offset from the center plane so that the close point during a write process may be aligned with the main pole tip position in the selected writer. As a result, the writing performance of the selected writer is similar to that observed for a state of the art single PMR writer. Typically, the selected writer is the writer with better ADC performance than the other writer in the dual PMR writer structure.

While the present disclosure has been particularly shown and described with reference to, the preferred embodiment thereof, it will be understood by those skilled in the art that various changes in form and details may be made without departing from the spirit and scope of this disclosure.

We claim:

1. A dual perpendicular magnetic recording (PMR) writer, comprising:
 (a) a first main pole layer in a first PMR writer having a first main pole tip with a leading side and trailing side at an air bearing surface (ABS), and bisected by a first plane that is at a first cross-track position and is orthogonal to the ABS;
 (b) a second main pole layer in a second PMR writer having a second main pole tip with a leading side and trailing side at the ABS, and bisected by a second plane that is orthogonal to the ABS, the second plane is at a second cross-track position and a first cross-track width from the first plane;
 (c) a bucking coil (BC) with a front side that is between the first and second planes, recessed from the ABS, and formed below the first and second main pole layers, the bucking coil has a substantially U shape and comprises:
  (1) a BC center portion with a substantially rectangular shape that extends from the BC front side to a backend that contacts an interconnect;
  (2) a BC first outer portion that is connected to the BC center portion with a first arm proximate to the BC front side and first plane; and
  (3) a BC second outer portion that is connected to the BC center portion with a second arm proximate to the BC front side and second plane;
 (d) a driving coil (DC) with a front side that is between the first and second planes, recessed from the ABS, and formed above the first and second main pole layers, the driving coil has a substantially U shape and comprises:
  (1) a DC center portion with a substantially rectangular shape that extends from the DC front side to a backend that contacts the interconnect;
  (2) a DC first outer portion that is connected to the DC center portion with a third arm proximate to the DC front side and first plane; and
  (3) a DC second outer portion that is connected to the DC center portion with a fourth arm proximate to the DC front side and second plane; and
 (e) the interconnect that completes a first circuit such that a first write current passing through the BC first outer portion, first arm, and BC center portion and interconnect to the DC center portion, third arm, and then to the DC first outer portion generates flux in the first main pole layer, or completes a second circuit wherein a second write current passing through the BC second outer portion, fourth arm, BC center portion and interconnect to the DC center portion, second arm, and then to the DC second outer portion generates flux in the second main pole layer.

2. The dual PMR writer of claim 1 further comprised of a dynamic fly height (DFH) heater formed in one or more dielectric layers behind the interconnect, wherein the DFH heater provides a first component of write gap (WG) protrusion at the ABS and with a maximum protrusion value at a center plane midway between the first and second planes when an operating voltage is applied.

3. The dual PMR writer of claim 2 wherein the BC center portion has a substantially greater direct current resistance (DCR) than the BC first and second outer portions, and wherein the DC center portion has a substantially greater DCR than the DC first and second outer portions when the first or second write current is applied thereby inducing a second component of WG protrusion at the ABS that is at a maximum value proximate to the center plane.

4. The dual PMR writer of claim 3 wherein the first and third arms in the first circuit have substantially greater DCR than the BC center portion and DC center portion, respectively, thereby inducing a third component of WG protrusion at the ABS that has a maximum value proximate to the first plane when the first write current passes through the first circuit.

5. The dual PMR writer of claim 4 wherein the first, second, and third components result in a net WG protrusion having a maximum value proximate to the first plane when the first PMR writer is used for a write process.

6. The dual PMR writer of claim 3 wherein the second and fourth arms in the second circuit have substantially greater DCR than the DC center portion and BC center portion, respectively, thereby inducing a third component of WG protrusion at the ABS that has a maximum value proximate to the second plane when the second write current passes through the second circuit.

7. The dual PMR writer of claim 6 wherein the first, second, and third components result in a net WG protrusion having a maximum value proximate to the second plane when the second PMR writer is used for a write process.

8. The dual PMR writer of claim 1 wherein the first cross-track width is about 10 microns.

9. The dual PMR writer of claim 1 wherein the BC center portion and DC center portion each have a cross-track width less than the first cross-track width.

10. The dual PMR writer of claim 1 wherein either the first PMR writer or the second PMR writer is selected as the better writer in terms of magnetic performance, and is electrically connected to a preamp in a head gimbal assembly (HGA) of a hard disk drive (HDD) while the other of the first or second PMR writer is not functional in the HGA because the first circuit or second circuit, respectively, is disabled.

11. The dual PMR writer of claim 10 wherein the first PMR writer has an electrical connection to the preamp in the HGA comprised of a first connection from the BC first outer portion to a first (W1+) pad, and a second connection from the DC first outer portion to a first (W1−) pad wherein the W1+ and W1−pads interface with a slider on which the dual PMR writer is formed.

12. The dual PMR writer of claim 10 wherein the second PMR writer has an electrical connection to the preamp in the HGA comprised of a first connection from the BC second outer portion to a first (W2−) pad, and a second connection from the DC second outer portion to a first (W2+) pad wherein the W2+ and W2−pads interface with a slider on which the dual PMR writer is formed.

13. A method of aligning a write gap (WG) protrusion close point during a write process with a first main pole tip in a first writer or with a second main pole tip in a second writer in a dual perpendicular magnetic recording (PMR) writer; comprising:
 (a) providing a first main pole with the first main pole tip which is bisected by a first plane that is at a first cross-track position and is orthogonal to an air bearing surface (ABS);
 (b) providing a second main pole with the second main pole tip which is bisected by a second plane that is at a second cross-track position and is orthogonal to the ABS, wherein the second plane is a first cross-track width from the first plane;
 (c) providing a bucking coil (BC) with a front side recessed from the ABS and formed below the first and second main poles and having a center portion extending from the BC front side to a BC backend that contacts an interconnect, and wherein the BC front side of the BC center portion is connected to BC first and second outer portions through first and second arms, respectively;
 (d) providing a driving coil (DC) with a front side recessed from the ABS and formed above the first and second main poles and having a center portion extending from the DC front side to a DC backend that contacts the interconnect, and wherein the DC front side of the DC center portion is connected to DC first and second outer portions through third and fourth arms, respectively;
 (e) determining a first cross-track WG protrusion profile by passing a first current through a dynamic fly height (DFH) heater in the dual PMR writer;
 (f) determining a second cross-track WG protrusion profile by passing a second current through a first circuit comprised of the BC first outer portion, first arm, BC center portion, interconnect, DC center portion, third arm, and DC first outer portion, or through a second circuit comprised of the BC second outer portion, second arm, BC center portion, interconnect, DC center portion, fourth arm, and DC second outer portion; and
 (g) repeating step (f) a plurality of times until an overlay of the second cross-track WG protrusion profile on the first cross-track WG protrusion profile generates a maximum WG protrusion at the first plane when the second current flows through the first circuit, or at the second plane when the second current flows through the second circuit.

14. The method of claim 13 wherein the BC center portion has a substantially greater direct current resistance (DCR) than the BC first and second outer portions, and wherein the DC center portion has a substantially greater DCR than the DC first and second outer portions thereby contributing a first component to the second cross-track WG protrusion profile having a maximum protrusion value that is proximate to a center plane formed midway between the first and second planes.

15. The method of claim 14 wherein the first and third arms in the first circuit have substantially greater DCR than the BC center portion and DC center portion, respectively, thereby contributing a second component to the second cross-track WG protrusion profile that has a maximum value proximate to the first plane when the second current passes through the first circuit.

16. The method of claim 14 wherein the second and fourth arms in the second circuit have substantially greater DCR than the DC center portion and BC center portion, respectively, thereby inducing a second component to the second cross-track WG protrusion profile that has a maximum value proximate to the second plane when the second current passes through the second circuit.

17. The method of claim 13 wherein the first writer is integrated in a head gimbal assembly (HGA) while the second writer is disabled, and wherein the first circuit is further comprised of a W1+ writer pad that delivers the second write current to the BC first outer portion, and a W1− writer pad that receives the second write current from the DC first outer portion, the W1+ and W1− writer pads are electrically connected to a preamp in the HGA.

18. The method of claim 13 wherein the second writer is integrated in a head gimbal assembly (HGA) while the first writer is disabled, and wherein the second circuit is further comprised of a W2− writer pad that delivers the second write current to the BC second outer portion, and a W2+ writer pad that receives the second write current from the DC second outer portion, the W2+ and W2− writer pads are electrically connected to a preamp in the HGA.

19. The method of claim 13 wherein each of the BC center portion and DC center portion has a substantially rectangular shape, and a has a cross-track width less than the first cross-track width.

20. The method of claim 13 wherein the first cross-track width is about 10 microns.

* * * * *